(12) United States Patent
Fukui et al.

(10) Patent No.: US 6,646,947 B2
(45) Date of Patent: Nov. 11, 2003

(54) DATA TRANSFER CONTROL DEVICE, SEMICONDUCTOR MEMORY DEVICE AND ELECTRONIC INFORMATION APPARATUS

(75) Inventors: Haruyasu Fukui, Yoshino-gun (JP); Ken Sumitani, Tenri (JP); Yasumichi Mori, Ikoma (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/184,133

(22) Filed: Jun. 26, 2002

(65) Prior Publication Data

US 2003/0007411 A1 Jan. 9, 2003

(30) Foreign Application Priority Data

Jun. 28, 2001 (JP) ........................................ 2001-197536

(51) Int. Cl.[7] ................................................. G11C 7/00
(52) U.S. Cl. ............................ 365/230.03; 365/189.01; 365/189.12
(58) Field of Search ....................... 365/189.01, 189.12, 365/230.03, 238.5

(56) References Cited

U.S. PATENT DOCUMENTS 5,361,343 A * 11/1994 Kosonocky et al. ... 365/185.11
5,724,553 A * 3/1998 Shigeeda ................ 711/170
6,240,032 B1 * 5/2001 Fukumoto ............... 365/222

FOREIGN PATENT DOCUMENTS

| JP | 58-166581  | 10/1983 |
| JP | 10-283768  | 10/1998 |
| JP | 11-085609  | 3/1999  |

* cited by examiner

Primary Examiner—Vu A. Le
(74) Attorney, Agent, or Firm—Morrison & Foerster LLP

(57) ABSTRACT

A data transfer control device of the present invention includes: a command recognition section for recognizing the input control command; a first address output section for controlling an output and storage order of the data transfer addresses and the data transfer completion address based on the input control command; a first memory address storage section for storing the data transfer start address of the first memory array output from the first address output section; a second memory address storage section for storing the data transfer start address of the second memory array output from the first address output section; a third memory address storage section for storing the data transfer completion address output from the first address output section.

17 Claims, 10 Drawing Sheets

FIG. 3

| | First cycle | | Second cycle | | Third cycle | | Fourth cycle | |
|---|---|---|---|---|---|---|---|---|
| | Address | Data | Address | Data | Address | Data | Address | Data |
| Data transfer command: first memory array ① → second memory array ② | | 03H | Transfer start address of ① | ① Start address latch enable 21 | Transfer completion address of ① | ① Coalition address latch enable 23 | Transfer start address of ② | ② Start address latch enable 22 |
| Data transfer command: second memory array ② → first memory array ① | | 0CH | Transfer start address of ② | ① Start address latch enable 22 | Transfer completion address of ② | ② Coalition address latch enable 23 | Transfer start address of ① | ① Start address latch enable 21 |
| Flash program command | | 40H | ① Program address | ① Start address latch | | | | |

FIG. 6

| | First cycle | | Second cycle | | Third cycle | | Fourth cycle | |
|---|---|---|---|---|---|---|---|---|
| | Address | Data | Address | Data | Address | Data | Address | Data |
| Data transfer command: first memory array ①→ second memory array ② | | 03H | Transfer start address of ① | ① Start address latch enable 21 | | Transfer data number | Transfer start address of ② | ② Start address latch enable 22 |
| | | | | | ① Data number latch enable 24 | | | |
| Data transfer command: second memory array ②→ first memory array ① | | 0CH | Transfer start address of ② | ① Start address latch enable 22 | | Transfer data number | Transfer start address of ① | ① Start address latch enable 21 |
| | | | | | ② Data number latch enable 24 | | | |

DATA TRANSFER CONTROL DEVICE, SEMICONDUCTOR MEMORY DEVICE AND ELECTRONIC INFORMATION APPARATUS

BACKGROUND OF THE INVENTION

1. Field of the Invention

The present invention relates to a data transfer control device for controlling data transfer operations performed between memories, a semiconductor memory device including the same data transfer control device, and an electronic information apparatus including the semiconductor memory device.

2. Description of the Related Art

Conventionally, unlike a memory such as DRAM (Dynamic Random Access Memory) or SRAM (Static Random Access Memory) which loses data stored therein when turned off, a nonvolatile semiconductor memory device (a nonvolatile memory) is characterized in that data stored in memory cells of the nonvolatile memory is not lost even when turned off. In addition to a flash memory which is now in wide use in mobile phones or the like, examples of the nonvolatile memory include FRAM (Ferro-Electric Random Access Memory) which is recently coming into use in IC cards or the like, MRAM (Magnetic Random Access Memory) which is being intensively developed, etc.

Nonvolatile memory and in particular flash memory are described herein.

Generally, in a flash memory, operation speed of a read operation, a write operation including a verify operation and an erase operation including a verify operation becomes slower for this order of operations. The read operation requires about 100 nanoseconds (nsec), the write operation including a verify operation requires about 30 microseconds (is), and the erase operation including a verify operation requires about 500 milliseconds (msec). That is, in the flash memory, the write and erase operations require extraordinary time as compared to the read operation.

On the other hand, a volatile semiconductor memory device representative of a DRAM and an SRAM is disadvantageous in that stored information is lost when turned off. However, the nonvolatile semiconductor memory device has a feature that a period of time required for the write operation is substantially equivalent to a period of time required for the read operation. For example, an SRAM completes each of the read and write operations in about 100 ns. That is, the SRAM can rewrite data in a period of time which is considerably short as compared to a period of time required for the write or erase operations of the flash memory.

Conventionally, a page buffer technique has been used for compensating for the disadvantage of the flash memory of the long time period required for the write operation. In the case where a central processing unit (CPU) processes data, since the write operation of the flash memory requires a long period of time, a latent period of a CPU is inevitably lengthened. When a large quantity of data is being written in the flash memory, the CPU cannot perform another process during the write operation.

Accordingly, a method has been utilized for apparently shortening the period of time required for the write operation by realizing a semiconductor memory device having a function of initially writing data in a nonvolatile semiconductor memory device called a page buffer, such as an SRAM in which a period of time required for the write operation is short, and then transferring batches of data from the nonvolatile semiconductor memory device to the flash memory. This releases the CPU from the data write operation on the flash memory which requires a long period of time, and thus can perform another process.

In this page buffer technique, an address in the page buffer is mirrored at an arbitrary address in the flash memory. Therefore, in a command sequence at the time of writing the data in the page buffer, a CPU issues a page buffer write command in the first cycle, inputs the number of batches of transfer data (hereinafter, referred to as "transfer data number") in the page buffer in the second cycle, and inputs as an operand of the command a set of an address in the flash memory and a batch of data to be written in the page buffer in the third cycle. This operation in the third cycle is repeatedly performed in the later cycles until sets of an address and a batch of transfer data are input such that the number of the sets corresponds to the transfer data number input in the second cycle. A CPU issues a confirmation command in the last cycle.

By extracting the transfer data number from this command sequence in the second cycle and by extracting a transfer start address from the command sequence and storing the extracted transfer start address in the page buffer in the third cycle, a write state machine (which is a circuit for controlling internal operations of the memory device and is also referred herein to as "WSM") uses the data, i.e., command information on the transfer data number, the transfer start address, etc., so as to perform a data transfer operation from the page buffer to the flash memory.

FIG. 9 shows an example of a primary structure of an address control circuit for use with the page buffer technique. In FIG. 9, when a command to transfer data is externally input to the WSM, the WSM controls an address control circuit 105 so as to start data transfer from the page buffer to the flash memory. This data transfer operation is further described in detail below.

As shown in FIG. 9, before starting the data transfer operation, the WSM controls the address control circuit 105 so as to store in a memory address register 100 the data transfer start address in the input command information via an external address pad A and store the transfer data number via a data pad D in a transfer data number register 102.

Next, the WSM controls the memory address register 100 so as to transfer the stored data transfer start address of the flash memory to a memory address counter 101 via a transfer bus 120 connected between the memory address register 100 and the memory address counter 101. This allows a flash memory array decoder 121 to perform a decode operation such that an address in a flash memory array to which data is transferred is set so as to be a data transfer start address while allowing a page buffer decoder 122 to perform a decode operation such that an address in the page buffer from which the data is transferred is set so as to be a transfer start address, i.e., a first address at which data to be written in the flash memory array is stored.

Next, a data counter 103 is reset so as to have an initial value. Then, the WSM accesses a memory cell selected according to the decoded address so as to read data from the page buffer and write the data in a memory cell at a transferee address in the flash memory.

This operation realizes a data write operation from the page buffer to the flash memory. When the data write operation from the page buffer to the flash memory is completed with respect to the decoded address, the WSM increments the memory address counter 101 such that an address of each of the page buffer and the flash memory is updated so as to be the next address (an address obtained by adding one bit to the current address). Similarly, the data counter 103 is incremented.

As described above, the WSM reads data at the updated address of the page buffer and writes the data in a memory cell corresponding to the updated address of the flash memory.

This operation is repeatedly performed. A comparison circuit 111 compares a value stored in the data counter 103 with a value latched by the data counter 103 which is the transfer data number in put from the WSM. When the comparison results in a match, the WSM detects that a final address is obtained, thereby completing the data transfer from the page buffer to the flash memory.

As devices using the page buffer technique described above, a semiconductor memory device which can reduce a decrease in data transfer rate by reducing overhead during data transfer (Japanese Laid-Open Patent Publication No. 11-85609, "SEMICONDUCTOR MEMORY DEVICE AND METHOD FOR MANAGING DATA STORED THEREIN"), and a memory device which can realize high-speed write access to data along with low power consumption (Japanese Laid-Open Patent Publication No. 10-283768, "MEMORY DEVICE AND METHOD FOR CONTROLLING DATA RECEPTION WHEN CLOCK OSCILLATION IS CEASED") have been suggested.

Further, there is a method of data transfer between two memories which is referred to as a direct memory access (DMA) method in which data is transferred from one memory to another. In the direct memory access method, a transfer start address is written in a memory address register via a direct memory access controller circuit and the number of words to be transferred is written in a word count register via a control circuit. After memory address data corresponding to the address of the memory address register is transferred to another memory, the memory address register is counted up so as to increase a value stored in the memory address register by "1" and the word count register is counted down so as to decrease a value stored in the word count register by "1". This operation is repeatedly performed until a value stored in the word counter register becomes zero.

As the direct memory access method described above, a memory addressing method which can reduce the quantity of hardware and reduce the load on software (Japanese Laid-Open Patent Publication No. 58-166581) has been suggested.

In a data write operation using the conventional page buffer described above, data is temporally stored in the page buffer having a fast writing speed and batches of data are transferred together from the page buffer to the flash memory. This data transfer method is intended to shorten the period of time required for writing data in the flash memory.

However, in this page buffer technique, an address in the page buffer is mirrored at an arbitrary address in the flash memory, and therefore there is no specific address in the page buffer, so that mutual data transfer cannot be performed. Therefore, in the page buffer technique, it is also not possible to read specific data written in the page buffer.

On the other hand, in the direct memory access, method, an access controller performs data transfer between two memory arrays separately provided on different semiconductor chips, and therefore the number of semiconductor chips required for data transfer is increased, thereby increasing an area on which the semiconductor chips are mounted.

Further, there is a problem that the duration of the data transfer is long since the data transfer is performed between different semiconductor chips.

In view of these problems, a semiconductor memory device in which a plurality of memory arrays are provided so as to be individually operable, and mutual data transfer between the memory arrays can be performed simultaneously as performing data read/write operations on respective memory arrays (Japanese Patent Application No. 2000-176182) has been suggested.

However, in such a semiconductor memory device, in order to perform data transfer, separate circuits are provided so as to perform data transfer from a first memory array to a second memory array or vice versa, and therefore it is not considered to commonly use data between circuits. Therefore, a layout area of a semiconductor chip is increased by, for example, providing plural sets of memory address registers exclusively used for each memory array according to an implementation method.

SUMMARY OF THE INVENTION

According to one aspect of the present invention, there is provided a data transfer control device for controlling mutual data transfer between first and second memory arrays based on an input control command and data transfer start addresses and a data transfer completion address of the first and second memory arrays, the device includes: a command recognition section for recognizing the input control command; a first address output section for controlling an output and storage order of the data transfer addresses and the data transfer completion address based on the input control command; a first memory address storage section for storing the data transfer start address of the first memory array output from the first address output section; a second memory address storage section for storing the data transfer start address of the second memory array output from the first address output section; a third memory address storage section for storing the data transfer completion address output from the first address output section; and a first comparison target address switch section for performing a switching operation from a memory address targeted for comparison with the data transfer completion address to a memory address corresponding to either the first or second memory arrays so as to detect the completion of the data transfer based on the input control command, and the mutual transfer between the first and second memory arrays is performed based on sequentially-incremented address values of the first and second memory address storage sections.

According to another aspect of the present invention, there is provided a data transfer control device for controlling mutual data transfer between first and second memory arrays based on an input control command and each of data transfer start addresses and data transfer completion addresses of the first and second memory arrays, and the device includes: a command recognition section for recognizing the input control command: a first address output section for outputting a data transfer start address of the first memory array, a data transfer completion address of the first memory array, and a data transfer start address of the second memory array based on the input control command in this storage order or outputting the data transfer start address of the second memory array, data transfer completion address of the second memory array and data transfer start address of the first memory array based on the input control command in this storage order; a first memory address storage section for storing the data transfer start address of the first memory array output from the first address output section; a first memory address counter section for incrementing a memory address for each unit of data transfer; a first memory address transfer section for transferring the data transfer start address from the first memory address storage section to the first memory address counter section; a second memory address storage section for storing the data transfer start address of the second memory array output from the first address output section; a second memory address counter section for incrementing a memory address for each unit of data transfer; a second memory address transfer section for transferring the data transfer start address from the second memory address storage section to the second memory address counter section; a third memory address storage section for storing the data transfer completion address output from the first address output section; a first comparison section for comparing a value of the data transfer completion address and a value of the first or second memory address counter section; a first comparison target address switch section for controlling a switch between values of the first and second memory address counter sections targeted for comparison to the data transfer completion address based on the input control command so as to compare the value of the data transfer completion address to any one of the values of the first and second memory address counter sections; and a first data transfer control section for performing the mutual data transfer between the first and second memory arrays based on address values set in the first and second memory address counter sections and completing the mutual data transfer based on a comparison result obtained by the first comparison section.

According to still another aspect of the present invention, there is provided a data transfer control device for controlling mutual data transfer between first and second memory arrays based on an input control command, data transfer start addresses and a data transfer completion address of the first and second memory arrays, and the number of batches of data to be transferred, and the device includes: a command recognition section for recognizing the input control command; a second address output section for controlling an output and storage order of the data transfer addresses and the data transfer completion address based on the input control command: a first memory address storage section for storing the data transfer start address of the first memory array output from the second address output section: a second memory address storage section for storing the data transfer start address of the second memory array output from the second address output section; a transfer data number storage section for storing the number of batches of data to be transferred output from the second address output section; a data counter section for incrementing the number of batches of data for each data transfer unit; a second comparison section for comparing the number of batches of data to a value of the data counter section; and a second data transfer control section performing the mutual data transfer between the first and second memory arrays based on values obtained by sequentially incrementing address values of the first and second memory address storage sections and completing the mutual data transfer based on a comparison result obtained by the second comparison section.

According to still another aspect of the present invention, there is provided a data transfer control device for controlling mutual data transfer between first and second memory arrays based on an input control command, data transfer start addresses and a data transfer completion address of the first and second memory arrays, and the number of batches of data to be transferred, and the device includes: a command recognition section for recognizing the input control command; a second address output section for outputting a data transfer start address of the first memory array, the number of batches of data to be transferred, and a data transfer start address of the second memory array based on the input control command in this storage order or outputting the data transfer start address of the second memory array, the number of batches of data to be transferred, and a data transfer start address of the first memory array based on the input control command in this storage order: a first memory address storage section for storing the data transfer start address of the first memory array output from the second address output section: a first memory address counter section for incrementing a memory address for each unit of data transfer: a first memory address transfer section for transferring the data transfer start address from the first memory address storage section to the first memory address counter section; a second memory address storage section for storing the data transfer start address of the second memory array output from the second address section; a second memory address counter section for incrementing a memory address for each unit of data transfer; a second memory address transfer section for transferring the data transfer start address from the second memory address storage section to the second memory address counter section; a transfer data number storage section for storing the number of batches of data to be transferred output from the second address output section; a data counter section for incrementing the number of batches of data for each data transfer unit; a second comparison section for comparing the number of batches of data to a value of the data counter section; and a second data transfer control section performing the mutual data transfer between the first and second memory arrays based on address values set in the first and second memory address counter sections and completing the mutual data transfer based on a comparison result obtained by the second comparison section.

In one embodiment of the invention, when memory capacities of the first and second memory arrays are different, a memory address storage section for storing an address of a memory array having a smaller memory capacity is provided with a first detection section for detecting whether or not unnecessary upper addresses are specific values.

In one embodiment of the invention, the data transfer control device includes a second determination section for detecting whether or not an address stored in the memory address counter section is a specific value.

In one embodiment of the invention, the first and second memory address storage sections are memory address registers.

According to still another aspect of the present invention, there is provided a semiconductor memory device including the data transfer control device of claim 1.

In one embodiment of the invention, the semiconductor memory device includes an address information storage section for storing address information which is controlled according to an input control command and represents an address targeted for a memory operation including data write, data erase, data read, and data verify operations designated by a control command for operations other than the data transfer operation, and the address information storage section is configured so as to be commonly used with the first or second memory address storage sections required for the data transfer.

According to still another aspect of the present invention, there is provided an electronic information apparatus including the semiconductor memory device of claim 15 which performs a memory operation and a data transfer operation.

Functions of the above-described structure are described below. By commonly using registers for storing address data required for mutual data transfer between the plurality of memory cell arrays provided on a single semiconductor chip so as to simplify a circuit, it is possible to reduce a layout area of the semiconductor chip. Further, since memory address storage means (registers) or the like, which are used for data transfer, can be used for memory operations in addition to the data transfer, it is possible to simplify the circuit, thereby reducing a layout area of a semiconductor chip. Furthermore, it is possible to easily apply the data transfer control device of the present invention to a semiconductor memory device, and further still it is possible to easily apply the same semiconductor memory device to an electronic information apparatus. Therefore, in the semiconductor device or the electronic information apparatus, it is also possible to simplify a circuit for performing a memory operation and a data transfer operation.

Thus, the invention described herein makes possible the advantages of providing: (1) a data transfer control device which can reduce a layout area of a semiconductor chip by commonly using registers for storing address data required for mutual data transfer between a plurality of memory cell arrays provided on a single semiconductor chip so as to achieve simplification of the circuits; (2) a semiconductor memory device including the same data transfer control device; and (3) an electronic information apparatus including the same semiconductor memory device.

These and other advantages of the present invention will become apparent to those skilled in the art upon reading and understanding the following detailed description with reference to the accompanying figures.

BRIEF DESCRIPTION OF THE DRAWINGS

FIG. 3 is a table illustrating a command sequence for data transfer performed using the data transfer control device of FIG. 1.

FIG. 6 is a table illustrating a command sequence for data transfer performed using the data transfer control device of FIG. 5.

DESCRIPTION OF THE PREFERRED EMBODIMENTS

Hereinafter, Embodiments 1–4 of the present invention will be described with reference to the drawings in conjunction with a case where a data transfer control device according to the present invention is applied to a semiconductor memory device.

Embodiment 1

Figure 1:
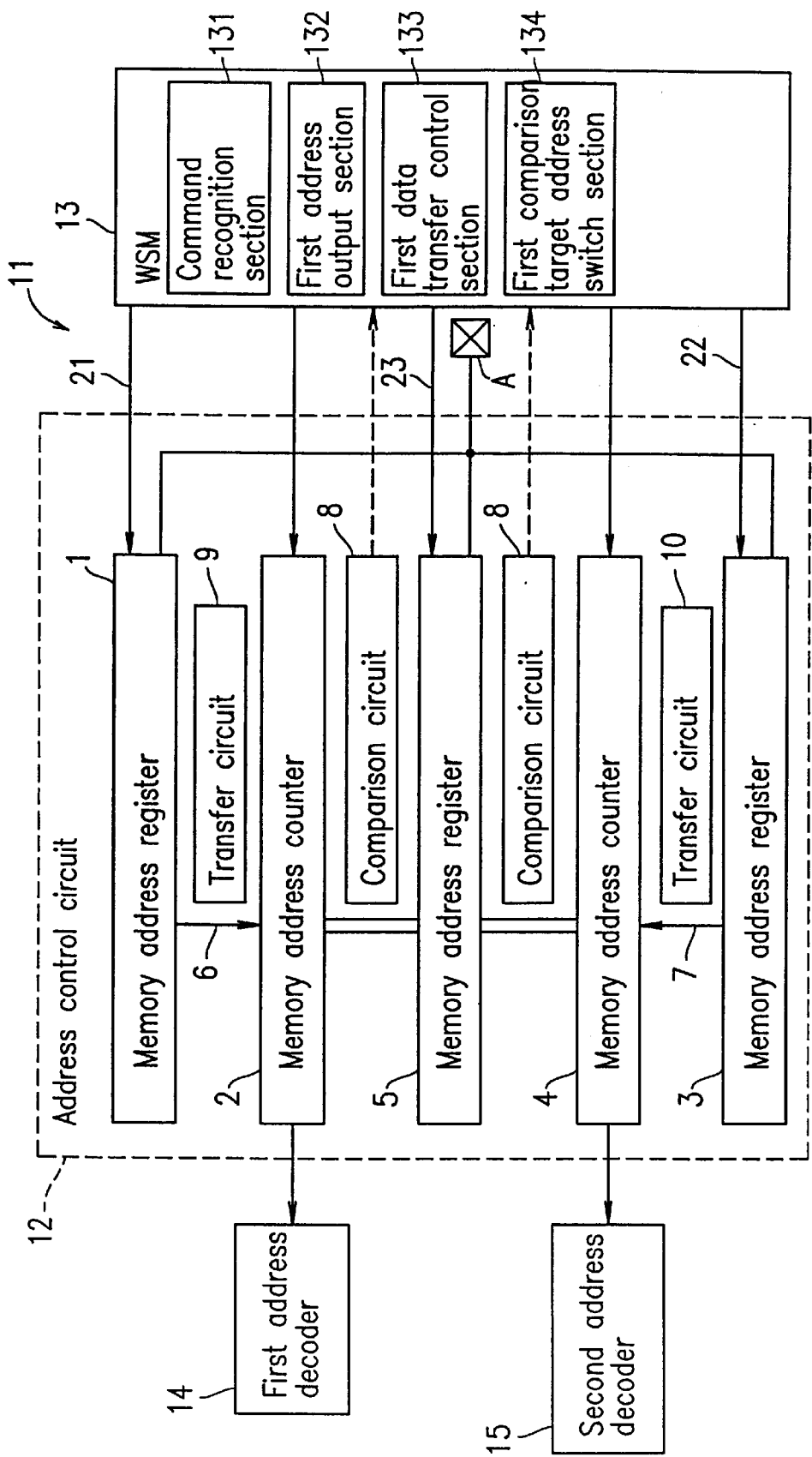
FIG. 1 is a block diagram showing a primary structure of a data transfer control device according to Embodiment 1 of the present invention.

FIG. 1 is a block diagram showing a primary structure of a data transfer control device 11 according to Embodiment 1 of the present invention.

In FIG. 1, the data transfer control device 11 includes an address control circuit 12 and a write state machine 13 (hereinafter, referred to as "WSM 13"). The data transfer control device 11 controls, according to an externally-input control command, the address control circuit 12 so as to perform data transfer between a plurality of memory arrays.

The address control circuit 12 includes a memory address register 1 which is a first memory address storage section on a first memory array side, a memory address counter 2 which is a first memory address counter section on the first memory array side, a memory address register 3 which is a second memory address storage section on a second memory array side, a memory address counter 4 which is a second memory address counter section on the second memory array side, a memory address register 5 which is a third memory address storage section, a comparison circuit 8 which is a comparison section for detecting completion of data transfer, a transfer circuit 9 which is a first memory address transfer section, and a transfer circuit 10 which is a second memory address transfer section.

The memory address register 1 includes a plurality of latch circuits required for storing necessary addresses for data transfer. The memory address register 1 stores a control target address (data transfer start address) of the first memory array while updating previous address data (previous data transfer start address) according to a control command described below and storing the updated data.

The memory address counter 2 can control as many addresses as the number of bits of the memory address register 1 and creates an address by adding one bit to a preset address according to an increment control signal controlled by the transfer circuit 9. That is, the memory address counter 2 increments an address of the first memory array according to the increment control signal from the transfer circuit 9. An output terminal of the memory address counter 2 is connected to a first address decoder 14 such that the first address decoder 14 selects a memory cell in the first memory array corresponding to the preset address, i.e., the first address decoder 14 performs data read/write operations, etc., on the memory cell.

The memory address register 3 includes a plurality of latch circuits required for storing necessary addresses for data transfer. The memory address register 3 stores a control target address (data transfer start address) of the second memory array while updating previous address data (previous data transfer start address) according to a control command described below and storing the updated data.

The memory address counter 4 can control as many addresses as the number of bits of the memory address register 3 and creates an address by adding one bit to preset address according to an increment control signal controlled by the transfer circuit 10. That is, the memory address counter 4 increments an address of the second memory array according to the increment control signal from the transfer circuit 10. An output terminal of the memory address counter 4 is connected to a second address decoder 15 such that the second address decoder 15 selects a memory cell in the second memory array corresponding to the preset address, i.e., the second address decoder 15 performs data read/write operations, etc., on the memory cell.

The memory address register 5 stores a data transfer completion address.

The comparison circuit 8 compares a value of the data transfer completion address stored in the memory address register 5 with a value of the memory address counter 2 on the first memory array side or a value of the memory address counter 4 on the second memory array side.

The transfer circuit 9 can control a transfer of memory address data (data transfer start address) from the memory address register 1 to the memory address counter 2 via a bus 6 and thereafter sequentially increment the memory address data each time a batch of data is transferred (for each data transfer unit).

The transfer circuit 10 can control a transfer of memory address data (data transfer start address) from the memory address register 3 to the memory address counter 4 via a bus 7 and thereafter sequentially increment the memory address data each time a batch of data is transferred (for each data transfer unit).

The WSM 13 includes a command recognition section 131, a first address output section 132, a first data transfer control section 133, and a first comparison target address switch section 134 which is a counter switch section.

The command recognition section 131 recognizes externally-input control commands (e.g., a data transfer command and flash program command shown in FIG. 3). When the input control command is a data transfer command, the command recognition section 131 detects whether data transfer is a first data transfer from the first memory array to the second memory array or a second data transfer from the second memory array to the first memory array so as to associate the data transfer with a command sequence corresponding to either the first data transfer or the second data transfer.

The first address output section 132 controls the memory address registers 1, 3 and 5 so as to store a corresponding one of the following addresses: a data transfer start address of the first memory array, a data transfer completion address of the first memory array, and a data transfer start address of the second memory array. Based on a command sequence corresponding to the input control command, these addresses are stored in the following order: the data transfer start address of the first memory array, the data transfer completion address of the first memory array, and the data transfer start address of the second memory array; or the data transfer start address of the second memory array, a data transfer completion address of the second memory array, and the data transfer start address of the first memory array in this order.

The first data transfer control section 133 performs mutual data transfer between the first and second memory arrays based on preset address values of the memory address counters 2 and 4 and completes the data transfer based on a comparison result (a correspondence between data in the first memory array and data in the second memory array) provided by the comparison circuit 8.

Based on the command sequence corresponding to the input control command, the first comparison target address switch section 134 switches an address value to an address value of either of the memory address counters 2 or 4 which is targeted for comparison to a data transfer completion address value.

Next, the command sequence for data transfer is described in detail.

Figure 2:
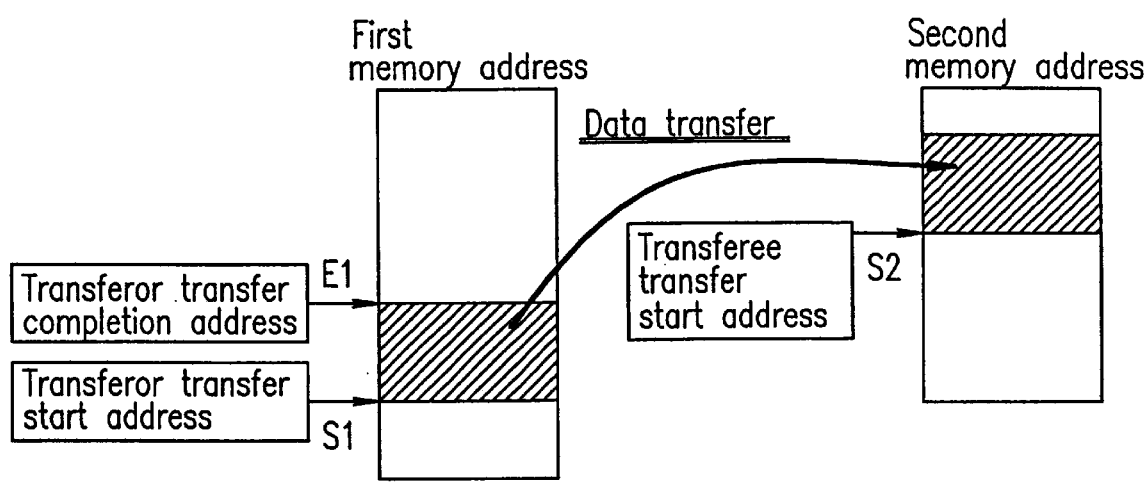
FIG. 2 is a diagram schematically illustrating an example of data transfer according to the present invention.

An example of data transfer illustrated in FIG. 2 is considered. Specifically, data stored at addresses from a transferor transfer start address S1 to a transferor transfer completion address E1 in the first memory array is sequentially transferred to the second memory array such that the transferred data is stored from a transferee transfer start address S2.

In this case, for example, a command sequence shown in FIG. 3 is issued for the data transfer from the first memory array to the second memory array.

A table shown in FIG. 3 illustrates a command sequence for data transfer from the first memory array to the second memory array (upper part), a command sequence for data transfer from the second memory array to the first memory array (middle part), a flash program command sequence (lower part), and internal operations of the WSM 13 (lower row in each part) corresponding to address data input in each cycle described below.

In the case of performing the data transfer from the first memory array to the second memory array, a command to declare data transfer (denoted by 03H) is input in the first command cycle, a transferor transfer start address of a memory array (in this case, the first memory array) is input in the second cycle, a transferor transfer completion address of a memory array (in this case, the first memory array) is input in the third cycle, and a transferee transfer start address of a memory array (in this case, the second memory array) is input in the fourth cycle.

Figure 4A:
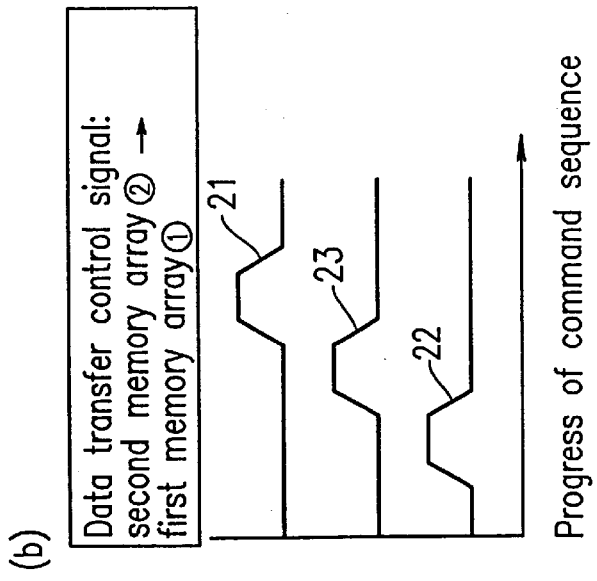
FIG. 4A is a diagram showing an example of latch timing of an address register according to the present invention.

The control command and address data as an operand of the control command, which are input in each cycle, are translated by the WSM 13 so as to generate latch enable signals 21 through 23 for a corresponding one of the memory address registers 1, 3 and 5 in the order shown in FIG. 4A. Specifically, the following operations are performed in the following order. An address input in the second command cycle is input as a data transfer start address of the first memory array in the memory address register 1, an address input in the third command cycle is input as a data transfer completion address of the first memory array in the memory address register 5, and an address input in the fourth command cycle is input as a data transfer start address of the second memory array in the memory address register 3.

This allows the WSM 13 included in the data transfer control device 11 to start data transfer from the first memory array to the second memory array.

Next, a summary of a data transfer method according to the present invention is provided.

Referring again to FIG. 1, at first, the WSM 13 transfers a data transfer start address of the first memory array stored in the memory address register 1 to the memory address counter 2 via the bus 6 and also transfers a data transfer start address of the second memory array stored in the memory address register 3 to the memory address counter 4 via the bus 7.

This allows a data transferor address to be set in the address counter 2 so as to decode the set address with respect to the first memory array and also allows a data transferee address to be set in the address counter 4 so as to decode the set address with respect to the second memory array.

Then, based on these set addresses, the WSM 13 reads data at the transferor address of the first memory array and writes the data at the transferee address of the second memory array address.

This operation realizes the data transfer. When a single data transfer operation is completed with respect to these set addresses, the WSM 13 increments each of the memory address counters 2 and 4 so as to set the next address (an address obtained by adding one bit to the current address) in the data transferor memory address counter 2 and the data transferee memory address counter 4.

Similarly, based on theses set addresses, the WSM 13 reads data at the transferor address and writes the data at the transferee address.

These operations are repeatedly performed and a value of the memory address counter 2 of the first memory array is compared by the comparison circuit 8 with the transfer completion address of the first memory array which is input in the third command cycle. When the value of the memory address counter 2 matches with the transfer completion address of the first memory array, the WSM 13 can detect that a final address is obtained.

Thereafter, based on the final address, the WSM 13 reads data from the transferor memory array and writes the data in the transferee memory address, thereby completing the data transfer.

In the case where the transferee memory array is a SRAM or the like, a verify operation is not necessary. However, in the case where the transferee memory array is a flash memory array, after the data write operation is completed, the verify operation is required for confirming whether or not the data write operation is normally performed.

In consideration of data transfer to the flash memory array, it is efficient to write batches of data stored at addresses from the data transfer start address to the data transfer completion address and then perform the data verify operation from data at the data transfer start address, rather than using an algorithm in which data is written at an address, the data is verified and then the data write/verify operations are performed with respect to the next address. The reason for this is that when the data transfer procedure is shifted from the data write operation to the data verify operation or the data verify operation to the data write operation, internal circuits are required to generate a particular voltage required for each operation, thereby requiring a certain period of time for the voltage switch.

Therefore, batches of data are written together in the flash memory array and in the data verify operation, the data transfer start addresses are transferred again from the memory address registers 1 and 3 to the corresponding memory address counters 2 and 4 via their respective buses 6 and 7.

The data verify operation is performed using a data transfer algorithm similar to that described in relation to the data write operation. Therefore, the memory address registers 1, 3 and 5 and the memory address counters 2 and 4, which are used for the data transfer, are commonly used for the verify transfer operation, and therefore it is possible to realize circuit simplification, thereby reducing an area of a semiconductor chip.

Data transfer from the second memory array to the first memory array, which is opposite to the data transfer described above with respect to a transfer direction of data, is now described.

In this case, in view of ease of use, it is considered that the transferor transfer start address, transferor transfer completion address, and the transferee transfer start address are included in a control command sequence in this order, as shown in FIG. 3. Specifically, for example, in the first command cycle, a command to declare data transfer(denoted by 0CH) is issued as a data transfer command. Further, different control commands are used for the data transfer from the first memory array to the second memory array and the data transfer from the second memory array to the first memory array.

Figure 4B:
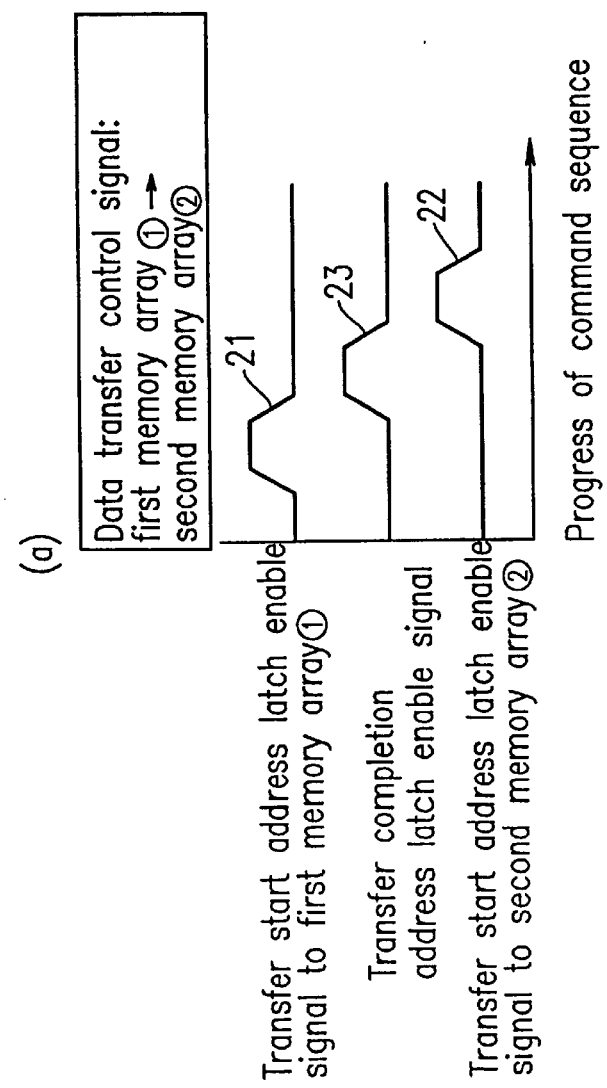
FIG. 4B is a diagram showing another example of latch timing of an address register according to the present invention.

As described above, by generating latch enable signals 22, 23 and 21 for a corresponding one of the memory address registers 3, 5 and 1 in the order shown in FIG. 4B in which a signal output timing is opposite to that shown in FIG. 4A so as to issue a data transfer start address of the transferor (second memory array) in the second command cycle, a data transfer completion address of the transferor (second memory array) in the third command cycle and a data transfer start address of the transferee (first memory array) in the fourth command cycle and sequentially store the respective issued addresses in a corresponding one of the memory address registers 3, 5 and 1 in this order, it is possible to realize mutual data transfer between memory arrays. According to a data transfer recognition command (control command) issued in the first command cycle, the order of storing addresses in the memory address registers is controlled and a target for comparison to the final address is switched.

Specifically, in either case of the data transfer from the first memory array to the second memory array or the data transfer from the second memory array to the first memory array, the transfer start addresses of the first and second memory arrays are always stored in corresponding memory address registers. This is realized by performing simple control so as to change the order of outputting of the latch enable signals 21–23 to a corresponding one of the memory address registers 1, 3 and 5.

When data is transferred from the first memory array to the second memory array, the data transfer completion address (the final address) is compared to a value of the memory address counter 2 of the first memory array, and when data is transferred from the second memory array to the first memory array, such comparison is performed with respect to the memory address counter 4 of the second memory array. In this manner, a target memory address counter is switched according to a transfer direction of data.

Next, a case where the memory address registers 1, 3 and 5 and the memory address counters 2 and 4 which are used for data transfer, are commonly used for memory control (read, write, etc.) other than data transfer is described.

For example, when the first memory array is a flash memory, in general, a program operation can be performed with respect to the flash memory according to a control command (flash program command). A command sequence in this case is shown in the lower part of FIG. 3.

In the first command cycle, for example, a command to declare data program (denoted by 40H) is issued as the program command. A flash memory address desired to program is issued in the second command cycle. The program address input in the second cycle is stored in the memory address register 1 corresponding to the first memory array according to the control of the WSM 13.

This is realized by an operation in which the WSM 13 controls a latch enable signal 21 to the memory address register 1 according to the recognition control command (program command) input in the first command cycle.

After the program command is issued, the transfer circuit 9 transfers a program address stored in the memory address transistor 1 to the memory address counter 2 such that the first address decoder 14 decodes an address at which a data program operation is desired to be performed, thereby selecting a memory cell. In this state, desired data is written in the flash memory, thereby completing the data program operation.

That is, in the present invention, it is possible to commonly use the memory address register 1 and the memory address counter 2 for the data transfer and normal data write operations between memory arrays. Further, it is possible to reduce a circuit size by providing registers and counters commonly used for each operation.

Embodiment 2

Although in Embodiment 1 of the present invention, a range of data to be transferred (hereinafter, referred to as "data transfer range") is expressed using the data transfer start address and data transfer completion address of the data transferor, in Embodiment 2 of the present invention, the data transfer range is expressed using the data transfer start address of the data transferor and a transfer data number which represents the number of batches data to be transferred.

Figure 5:
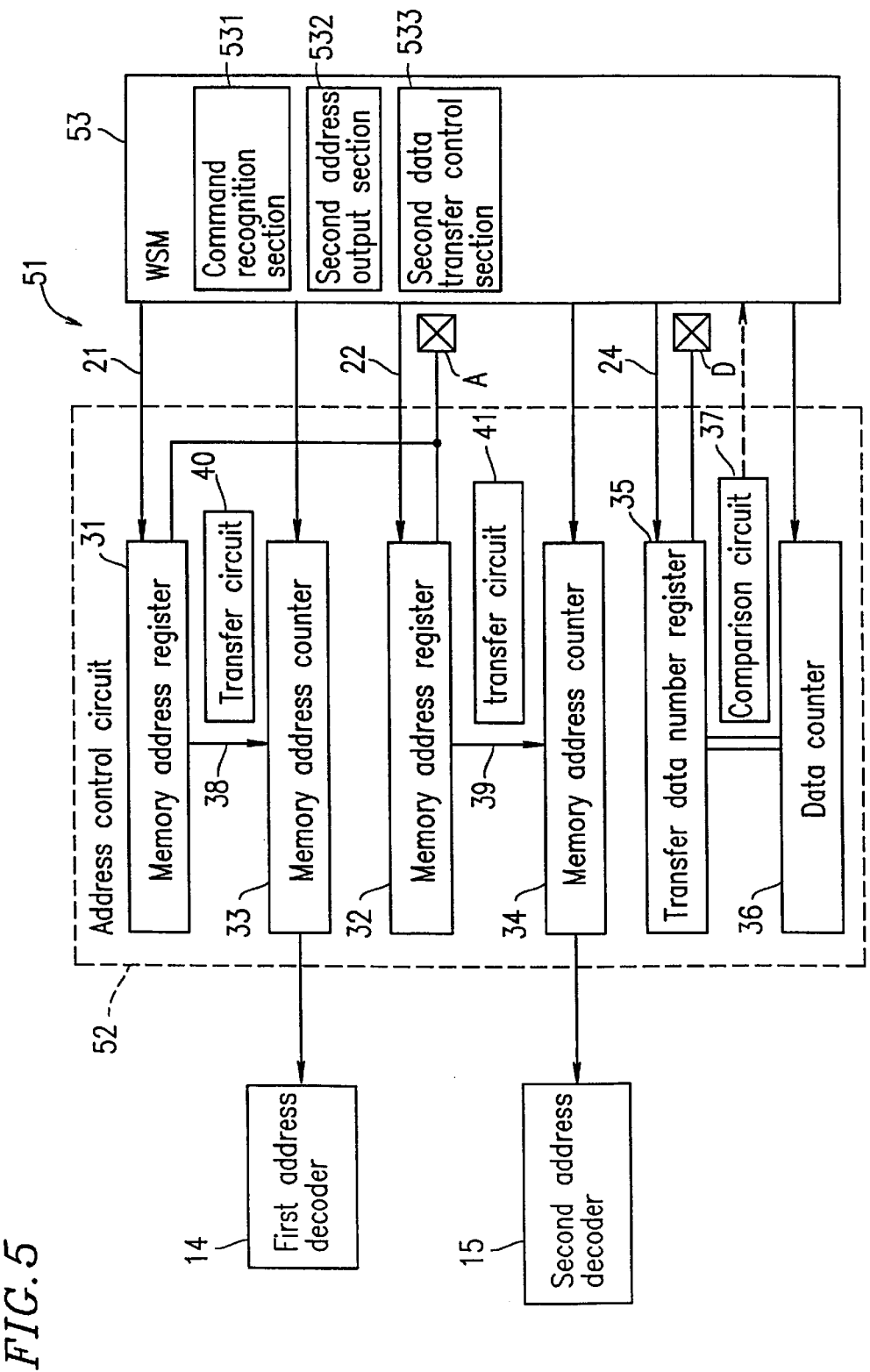
FIG. 5 is a block diagram showing a primary structure of a data transfer control device according to Embodiment 2 of the present invention.

FIG. 5 is a block diagram showing a primary structure of a data transfer control device 51 according to Embodiment 2 of the present invention. FIG. 6 is a table illustrating a command sequence of the data transfer control device 51.

In FIG. 5, the data transfer control device 51 includes an address control circuit 52 and a WSM 53. The address control circuit 52 includes a transfer data number register 35 for storing the transfer data number input via a data pad D which is an external data input/output terminal, a data counter 36 for sequentially adding (incrementing) "1" to an initial value, i.e., the value is sequentially increased by 1, and a comparison circuit 37 for comparing the transfer data number stored in the transfer data number register 35 with a value of the data counter 36. Embodiment 2 (FIG. 5) is different from Embodiment 1 (FIG. 1) in that the transfer data number register 35, the data counter 36 and the comparison circuit 37 are provided in place of the memory address register 5 for storing the data transfer completion address and comparison circuit 8.

The WSM 53 includes a command recognition section 531 a second address output section 532 and a second data transfer control section 533.

The command recognition section 531 recognizes an externally-input control command (such as a data transfer command shown in FIG. 6) and data for each control target address (a data transfer start address and the transfer data number for each of the first and second memory arrays). When an input control command is a data transfer command, the command recognition section 531 detects whether the data transfer command is a first data transfer from the first memory array to the second memory array or a second data transfer from the second memory array to the first memory array so as to associate a corresponding command sequence with either one of the first or second data transfers.

Based on the input control command, the second address output section 532 outputs a data transfer start address of the first memory array, the transfer data number and a data transfer start address of the second memory array according to this storage order or the data transfer start address of the second memory array, the transfer data number and the data transfer start address of the first memory array according to this storage order.

The second data transfer control section 533 performs mutual data transfer between the first and second memory arrays based on an address value preset in each of first and second memory address counters 33 and 34 and completes the data transfer based on a comparison result (a correspondence between data in the first memory array and data in the second memory array) provided by the comparison circuit 37 which is a second comparison section.

As shown in FIG. 6, in a command sequence of this operation, a command to declare data transfer (denoted by 03H) is input in the first command cycle, a transfer start address of a transferor memory array is input in the second command cycle, the transfer data number is input in the third command cycle, and a transfer start address of a transferee memory array is input in the fourth command cycle.

This allows the WSM 53 included in the data transfer control device 51 for controlling data transfer to start the data transfer from the first memory array to the second memory array.

Referring again to FIG. 5, the WSM 53 controls a transfer circuit 40 so as to transfer the stored data transfer start address of the first memory array from the memory address register 31 to the memory address counter 33 via a bus 38. The WSM 53 also controls a transfer circuit 41 so as to transfer the stored data transfer start address of the second memory array from the memory address register 32 to the memory address counter 34 via a bus 39. This allows an address of a data transferor to be set in the address counter 33 such that a first address decoder 14 decodes the set address in the first memory array and also allows an address of the data transferee to be set in the memory address counter 34 such that a second address decoder 15 decodes the set address in the second memory array.

Further, the data counter 36 is reset so as to have an initial value. Then, based on these set addresses, the WSM 53 reads data at the address of the data transferor and writes the data at the address of the data transferee.

This operation realizes the data transfer. When the data transfer is completed with respect to these set addresses, the WSM 53 increments each of the data transferor memory address counter 33 and the data transferee memory address counter 34 so as to set the next address (an address obtained by adding one bit to the current address) in each of the data transferor memory address counter 33 and the data transferee memory address counter 34. Similarly, the data counter 36 is incremented.

As in the operation described above, based on these set addresses, the WSM 53 reads data at the transferor address and writes the data at the transferee address. These operations are repeatedly performed and a value of the data counter 36 is compared by the comparison circuit 37 with a value latched by the transfer data number register 35 which is the transfer data number input in the third command cycle. When the comparison results in a match, the WSM 53 can detect that a final address is obtained, thereby completing the data transfer.

Data transfer from the second memory array to the first memory array, which is opposite to the data transfer described above, is described next.

In the command sequence shown in FIG. 6, a command to declare data transfer (denoted by 0CH) is issued in the first command cycle, a transfer start address of the second memory array is input in the second command cycle, a transfer data number is input in the third command cycle, and a transfer start address of the first memory array is input in the fourth cycle.

This allows the WSM 53 included in the data transfer control device 51 for controlling data transfer to start data transfer from the second memory array to the first memory array.

The WSM 53 controls the transfer circuit 40 so as to transfer the stored data transfer start address of the first memory array from the memory address transistor 31 to the memory address counter 33 via the bus 38 (FIG. 5) and controls the transfer circuit 41 so as to transfer the stored data transfer start address from the memory address register 32 to the memory address counter 34 via the bus 39.

This allows an address of the data transferor to be set in the memory address counter 33 such that the first address decoder 14 decodes the set address in the first memory array and also allows an address of the data transferee to be set in the memory address counter 34 such that the second address decoder 15 decodes the set address in the second memory array.

Next, a data counter 36 is reset so as to have an initial value. Then, based on these set addresses, the WSM 53 reads data at the address of the data transferor and writes the data at the address of the data transferee.

This operation realizes the data transfer. When the data transfer is completed with respect to these set addresses, the WSM 53 (or transfer circuits 40 and 41) increments each of the data transferor memory address counter 33 and the data transferee memory address counter 34 so as to set the next address (an address obtained by adding one bit to the current address) in each of the data transferor memory address counter 33 and the data transferee memory address counter 34. Similarly, the data counter 36 is incremented.

As in the operation described above, based on these set addresses, the WSM 53 reads data at the transferor address and writes the data at the transferee address.

This operation is repeatedly performed and a value of the data counter 36 is compared by the comparison circuit 37 with a value latched by the transfer data number register 35 which is the transfer data number input in the third command cycle. When the comparison results in a match, the WSM 53 can detect that a final address is obtained, thereby completing the data transfer.

Embodiment 3

Embodiment 3 of the present invention is described with respect to a case where it is detected whether or not the memory address register 3 described in Embodiment 1 has a specific value.

Figure 7:
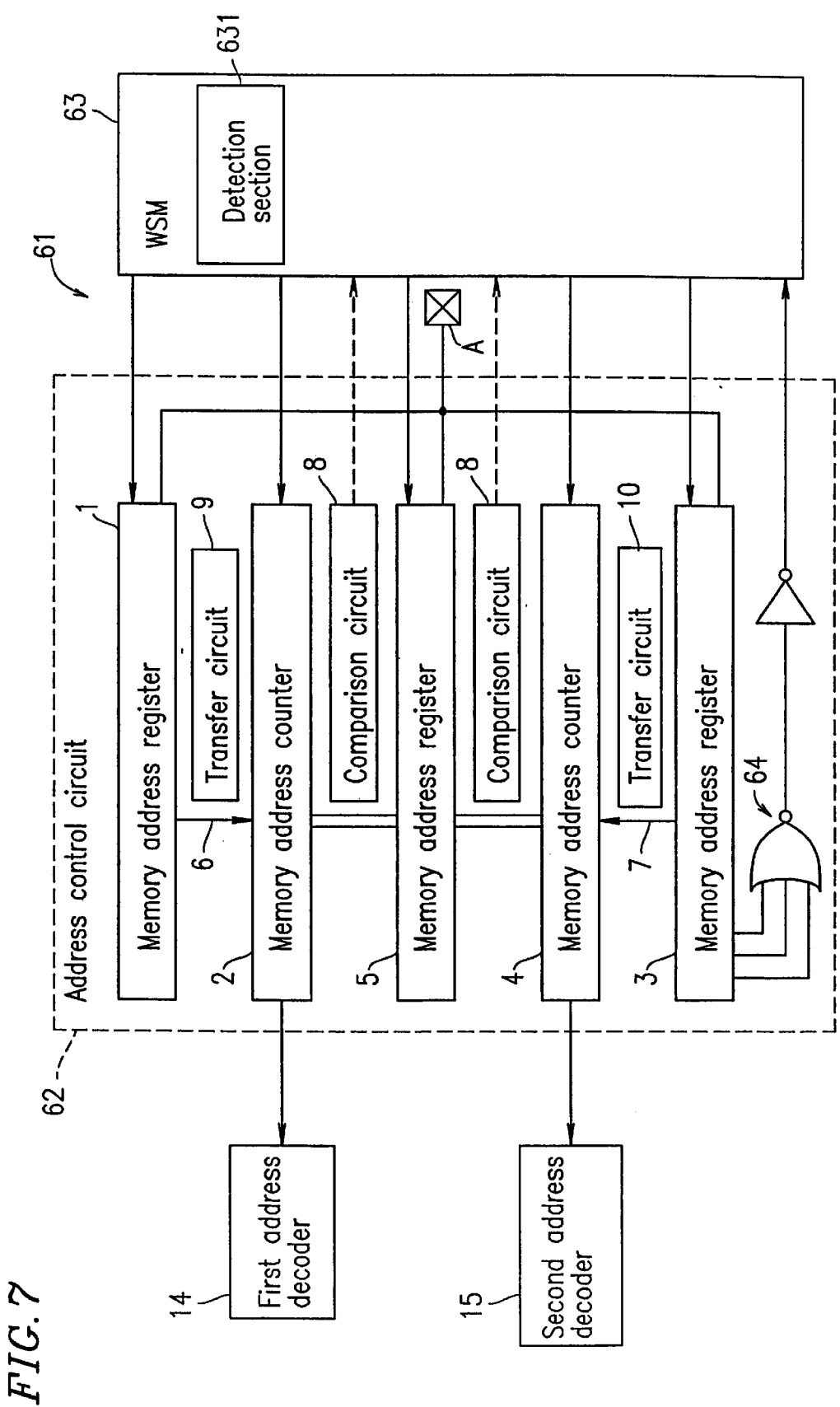
FIG. 7 is a block diagram showing a primary structure of a data transfer control device according to Embodiment 3 of the present invention.

FIG. 7 is a block diagram showing a primary structure of a data transfer control device 61 according to Embodiment 3 of the present invention. In FIG. 7, components achieving similar effects to those achieved by the components of FIG. 1 will be denoted by the same reference numerals, and thus description thereof will be omitted.

In the case where the first and second memory arrays have different memory capacities and the number of address bits required for designating data is different in each memory array, it is problematic to handle an upper address which is not required for inputting the data transfer start address and the data transfer completion address of a memory array having a smaller number of address bits. Although it does not matter if this upper address is "don't care (any value)", when the upper bit is a specific value, it is advantageous to increasing the memory capacity in the future.

For example, as shown in FIG. 7, by providing a detection circuit 64 including a logic circuit and an inverter to, for example, a memory address register 3 of an address control circuit 62 and connecting an output terminal of the detection circuit 64 to a WSM 63 such that a detection section 631 in the WSM 63 detects whether or not a value stored in the memory address register 3 is a specific value, the WSM 63 can check, by means of the detection circuit 64 and the detection section 631, that all of the unnecessary upper addresses (in Embodiment 3, upper three bits) are, for example, "0" when the memory capacity of the second memory array is smaller than that of the first memory array. When this is not satisfied (e.g., when at least either one of the data transfer start address or the data transfer completion address corresponds to an address in the other memory array having an increased capacity), it is possible to interrupt data transfer.

In the case where the detection circuit 64 and the detection section 631 act together as a first detection section and the first and second memory arrays have different memory capacities, the first detection section can detect whether or not a memory address register, e.g., the memory address register 3, for storing an address of a memory array having a smaller capacity has specific values for unnecessary upper bits. This allows the memory array having a smaller capacity to be detected. For example, it is possible to detect whether or not at least either the data transfer start address or the data transfer completion address is present in that memory array.

Embodiment 4

Embodiment 4 of the present invention is described with respect to a case where it is detected whether or not the memory address counter 2 described in Embodiment 1 has a specific value. For example, when the first memory array is a flash memory array, it is detected whether or not a current set address is a leading address of a memory block.

Figure 8:
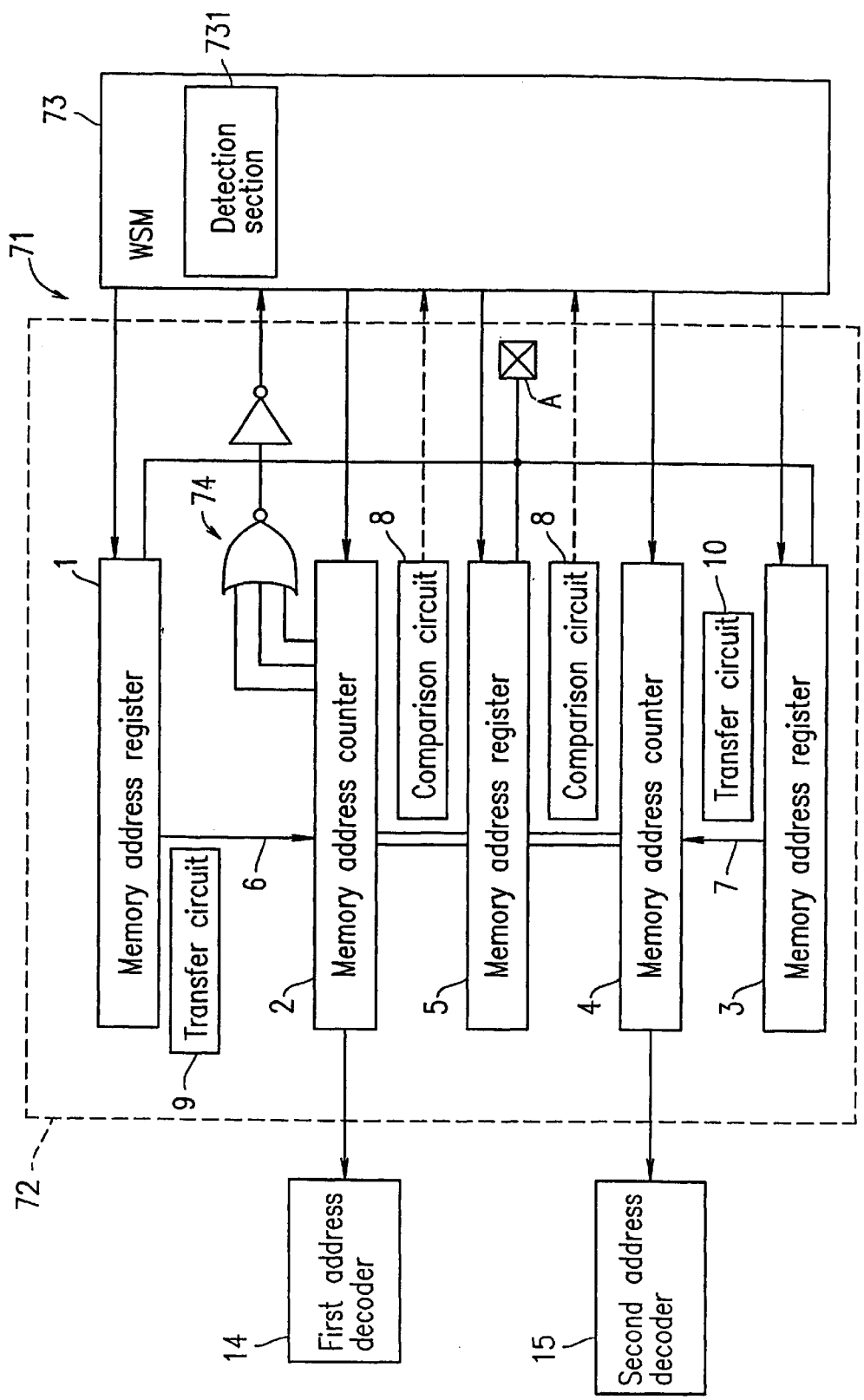
FIG. 8 is a block diagram showing a primary structure of a data transfer control device according to Embodiment 4 of the present invention.
Figure 9:
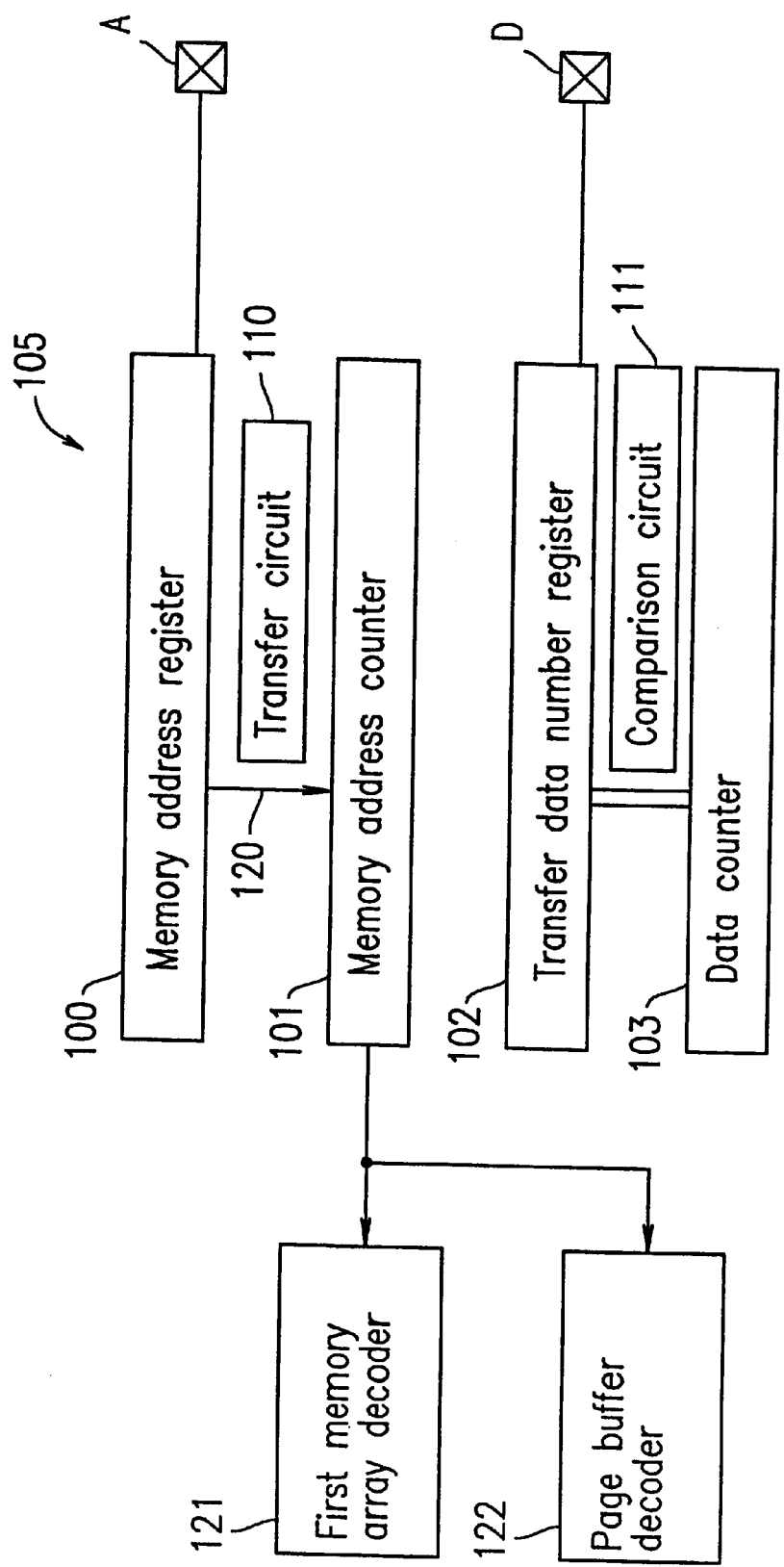
FIG. 9 is a block diagram showing a primary structure of an address control circuit for use with a conventional buffer technique.

FIG. 8 is a block diagram showing a primary structure of a data transfer control device 71 according to Embodiment 4 of the present invention. In FIG. 8, components achieving similar effects to those achieved by the components of FIG. 1 will be denoted by the same reference numerals, and thus description thereof will be omitted.

For example, when detecting whether or not the current set address is a leading address of a memory block in a flash memory array, as shown in FIG. 8, by providing a detection circuit 74 including a logic circuit and an inverter to, for example, the memory address counter 2 of an address control circuit 72 and connecting an output terminal of the detection circuit 74 to a WSM 73, it is possible to use a detection section 731 in the WSM 73 so as to detect whether or not a value of the memory address counter 2 is a specific value. For example, if it is possible to detect that all of the bits lower than the address of the memory block are "0", it is possible to check the boundaries between memory blocks by causing the detection section 731 in the WSM 73 to check this value, thereby controlling the WSM 73 so as to perform, for example, a protect check on the memory blocks.

In the case where the detection circuit 74 and the detection section 731 act together as a second detection section, the second detection section can detect whether or not an address held by, for example, the memory address counter 2 (or a memory address counter 4) is a specific value, thereby checking boundaries of the memory blocks, for example.

As described above, according to Embodiments 1 through 4 of the present invention, a register storing address data required for data transfer can be commonly used for mutual data transfer between a plurality of memory arrays provided on a same semiconductor chip and the same register can be used in other operations in addition to the data transfer, thereby simplifying a control circuit. Further, the simplification of the control circuit leads to a reduction in a layout area of a semiconductor chip.

Figure 10:
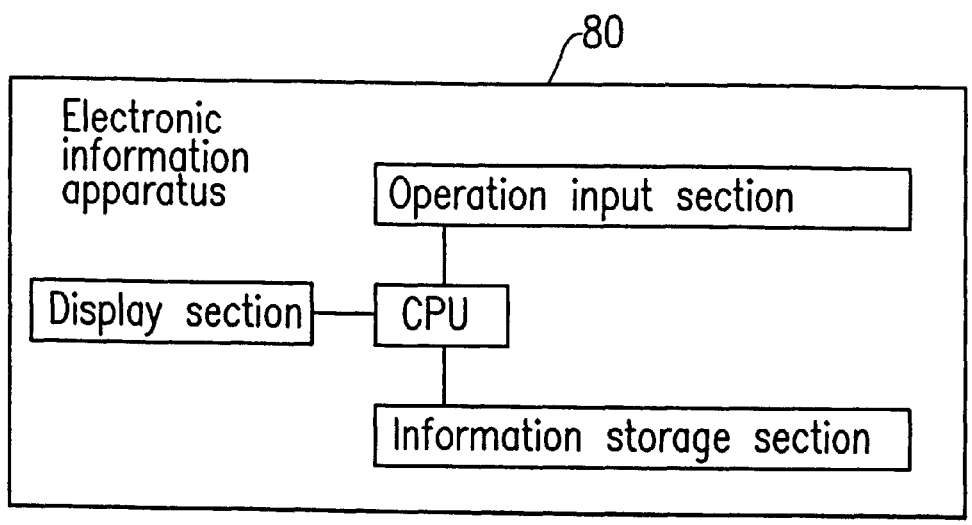
FIG. 10 is a block diagram showing a basic structure of an electronic information apparatus to which a semiconductor memory device including the data transfer control device of FIG. 1 is applied.

Although Embodiments 1 through 4 of the present invention have been described with respect to the data transfer control device of the present invention and the semiconductor memory device including this data transfer control device, the semiconductor memory device of the present invention can be easily incorporated into an electronic information device, such as a mobile phone or a computer, thereby realizing a semiconductor chip having a smaller area. For example, as shown in FIG. 10, in the case where there is provided an electronic information apparatus 80 which includes: an information storage section such as a RAM (SRAM, DRAM or the like) or ROM (a flash memory or the like); an operation input section; a display section, such as a liquid crystal display device, which displays a startup screen, results of information processing, etc.; and a CPU which receives a control command from the operation input section and processes information (e.g., video data, audio data, etc.) based on a prescribed information processing program and data associated with the information processing program whilst performing information reading and writing processes (memory operations) and a data transfer operation on the information storage section, the semiconductor memory device of the present invention can be easily incorporated into the electronic information apparatus 80 as the information storage section.

As described above, according to the present invention, by commonly using a register storing address data required for data transfer for mutual data transfer between a plurality of memory arrays provided on a same semiconductor chip, it is possible to simplify a control circuit, thereby reducing a layout area of a semiconductor chip.

Further, since memory address storage means (registers) or the like, which are used for data transfer, can be used for other operations in addition to the data transfer, it is possible to simplify a control circuit, thereby reducing a layout area of a semiconductor chip.

Furthermore, it is possible to easily apply the data transfer control device of the present invention to a semiconductor memory device, and further still it is possible to easily apply the same semiconductor memory device to an electronic information apparatus. In such cases, it is also possible to simplify a circuit for performing a memory operation and a data transfer operation, thereby reducing a layout area of a semiconductor chip.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data transfer control device for controlling mutual data transfer between first and second memory arrays based on an input control command and data transfer start addresses and a data transfer completion address of the first and second memory arrays, the device comprising:
    a command recognition section for recognizing the input control command;
    a first address output section for controlling an output and storage order of the data transfer start addresses and the data transfer completion address based on the input control command;
    a first memory address storage section for storing the data transfer start address of the first memory array output from the first address output section;
    a second memory address storage section for storing the data transfer start address of the second memory array output from the first address output section;
    a third memory address storage section for storing the data transfer completion address output from the first address output section; and
    a first comparison target address switch section for performing a switching operation from a memory address targeted for comparison with the data transfer completion address to a memory address corresponding to either the first or second memory arrays so as to detect the completion of the data transfer based on the input control command,
    wherein the mutual data transfer between the first and second memory arrays is performed based on sequentially-incremented address values of the first and second memory address storage sections.

2. A data transfer control device for controlling mutual data transfer between first and second memory arrays based on an input control command and each of data transfer start addresses and data transfer completion addresses of the first and second memory arrays, the device comprising:
    a command recognition section for recognizing the input control command;
    a first address output section for outputting a data transfer start address of the first memory array, a data transfer completion address of the first memory array, and a data transfer start address of the second memory array based on the input control command in this storage order or outputting the data transfer start address of the second memory array, data transfer completion address of the second memory array and data transfer start address of the first memory array based on the input control command in this storage order;
    a first memory address storage section for storing the data transfer start address of the first memory array output from the first address output section;
    a first memory address counter section for incrementing a memory address for each unit of data transfer;
    a first memory address transfer section for transferring the data transfer start address from the first memory address storage section to the first memory address counter section;
    a second memory address storage section for storing the data transfer start address of the second memory array output from the first address output section;
    a second memory address counter section for incrementing a memory address for each unit of data transfer;
    a second memory address transfer section for transferring the data transfer start address from the second memory address storage section to the second memory address counter section;
    a third memory address storage section for storing the data transfer completion address output from the first address output section;
    a first comparison section for comparing a value of the data transfer completion address and a value of the first or second memory address counter section;
    a first comparison target address switch section for controlling a switch between values of the first and second memory address counter sections targeted for comparison to the data transfer completion address based on the input control command so as to compare the value of the data transfer completion address to any one of the values of the first and second memory address counter sections; and a first data transfer control section for performing the mutual data transfer between the first and second memory arrays based on address values set in the first and second memory address counter sections and completing the mutual data transfer based on a comparison result obtained by the first comparison section.

3. A data transfer control device for controlling mutual data transfer between first and second memory arrays based on an input control command, data transfer start addresses and a data transfer completion address of the first and second memory arrays, and the number of batches of data to be transferred, the device comprising:

a command recognition section for recognizing the input control command;

a second address output section for controlling an output and storage order of the data transfer addresses and the data transfer completion address based on the input control command;

a first memory address storage section for storing the data transfer start address of the first memory array output from the second address output section;

a second memory address storage section for storing the data transfer start address of the second memory array output from the second address output section;

a transfer data number storage section for storing the number of batches of data to be transferred output from the second address output section;

a data counter section for incrementing the number of batches of data for each data transfer unit;

a second comparison section for comparing the number of batches of data to a value of the data counter section; and a second data transfer control section performing the mutual data transfer between the first and second memory arrays based on values obtained by sequentially incrementing address values of the first and second memory address storage sections and completing the mutual data transfer based on a comparison result obtained by the second comparison section.

4. A data transfer control device for controlling mutual data transfer between first and second memory arrays based on an input control command, data transfer start addresses and a data transfer completion address of the first and second memory arrays, and the number of batches of data to be transferred, the device comprising:

a command recognition section for recognizing the input control command:

a second address output section for outputting a data transfer start address of the first memory array, the number of batches of data to be transferred, and a data transfer start address of the second memory array based on the input control command in this storage order or outputting the data transfer start address of the second memory array, the number of batches of data to be transferred, and a data transfer start address of the first memory array based on the input control command in this storage order;

a first memory address storage section for storing the data transfer start address of the first memory array output from the second address output section;

a first memory address counter section for incrementing a memory address for each unit of data transfer;

a first memory address transfer section for transferring the data transfer start address from the first memory address storage section to the first memory address counter section;

a second memory address storage section for storing the data transfer start address of the second memory array output from the second address section;

a second memory address counter section for incrementing a memory address for each unit of data transfer;

a second memory address transfer section for transferring the data transfer start address from the second memory address storage section to the second memory address counter section;

a transfer data number storage section for storing the number of batches of data to be transferred output from the second address output section:

a data counter section for incrementing the number of batches of data for each data transfer unit;

a second comparison section for comparing the number of batches of data to a value of the data counter section; and a second data transfer control section performing the mutual data transfer between the first and second memory arrays based on address values set in the first and second memory address counter sections and completing the mutual data transfer based on a comparison result obtained by the second comparison section.

5. A data transfer control device according to claim 1, wherein when memory capacities of the first and second memory arrays are different, a memory address storage section for storing an address of a memory array having a smaller memory capacity is provided with a first detection section for detecting whether or not unnecessary upper addresses are specific values.

6. A data transfer control device according to claim 2, wherein when memory capacities of the first and second memory arrays are different, a memory address storage section for storing an address of a memory array having a smaller memory capacity is provided with a first detection section for detecting whether or not unnecessary upper addresses are specific values.

7. A data transfer control device according to claim 3, wherein when memory capacities of the first and second memory arrays are different, a memory address storage section for storing an address of a memory array having a smaller memory capacity is provided with a first detection section for detecting whether or not unnecessary upper addresses are specific values.

8. A data transfer control device according to claim 4, wherein when memory capacities of the first and second memory arrays are different, a memory address storage section for storing an address of a memory array having a smaller memory capacity is provided with a first detection section for detecting whether or not unnecessary upper addresses are specific values.

9. A data transfer control device according to claim 2, comprising a second determination section for detecting whether or not an address stored in the memory address counter section is a specific value.

10. A data transfer control device according to claim 4, comprising a second determination section for detecting whether or not an address stored in the memory address counter section is a specific value.

11. A data transfer control device according to claim 1, wherein the first and second memory address storage sections are memory address registers.

12. A data transfer control device according to claim 2, wherein the first and second memory address storage sections are memory address registers.

13. A data transfer control device according to claim 3, wherein the first and second memory address storage sections are memory address registers.

14. A data transfer control device according to claim 4, wherein the first and second memory address storage sections are memory address registers.

15. A semiconductor memory device including the data transfer control device of claim 1.

16. A semiconductor memory device according to claim 15, comprising an address information storage section for storing address information which is controlled according to an input control command and represents an address targeted for a memory operation including data write, data erase, data read, and data verify operations designated by a control command for operations other than the data transfer operation, wherein the address information storage section is configured so as to be commonly used with the first or second memory address storage sections required for the data transfer.

17. An electronic information apparatus including the semiconductor memory device of claim 15 which performs a memory operation and a data transfer operation.

* * * * *